(12) United States Patent
Keller et al.

(10) Patent No.: US 11,560,939 B2
(45) Date of Patent: Jan. 24, 2023

(54) ELECTRIC CYLINDER WITH LUBRICATING OIL FILLING

(71) Applicant: Robert Bosch GmbH, Stuttgart (DE)

(72) Inventors: Bernhard Keller, Wasserlosen (DE); Markus Rumpel, Werneck (DE); Steffen Pfister, Niederwerrn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/495,143

(22) Filed: Oct. 6, 2021

(65) Prior Publication Data
US 2022/0112940 A1 Apr. 14, 2022

(30) Foreign Application Priority Data
Oct. 8, 2020 (DE) .................. 10 2020 212 703.4

(51) Int. Cl.
*F16H 25/22* (2006.01)
*F16H 57/04* (2010.01)
*F16H 25/20* (2006.01)

(52) U.S. Cl.
CPC ..... *F16H 25/2252* (2013.01); *F16H 57/0416* (2013.01); *F16H 57/0497* (2013.01); *F16H 2025/204* (2013.01); *F16H 2025/2081* (2013.01)

(58) Field of Classification Search
CPC ............. F16H 25/2252; F16H 57/0497; F16H 57/0416; F16H 57/0454; F16H 2025/2436; F16H 25/2418; F16H 2025/2031; F16H 2025/2034; F16H 25/20
See application file for complete search history.

(56) References Cited

U.S. PATENT DOCUMENTS

| | | | | |
|---|---|---|---|---|
| 9,790,969 B2* | 10/2017 | Fenn | ....................... | F15B 15/19 |
| 10,626,980 B2* | 4/2020 | Rosengren | ........... | H02K 5/1735 |
| 2009/0260464 A1* | 10/2009 | Holker | ................ | F16H 57/0497 |
| | | | | 74/89.44 |
| 2010/0282901 A1* | 11/2010 | Mason | ..................... | B64C 25/18 |
| | | | | 244/102 R |
| 2017/0341227 A1* | 11/2017 | Sentis | .................. | B25J 19/0091 |
| 2020/0164457 A1* | 5/2020 | Rosengren | .............. | F16H 25/20 |

FOREIGN PATENT DOCUMENTS

| | | |
|---|---|---|
| DE | 10 2012 217 399 A1 | 3/2014 |
| DE | 10 2013 215 865 A1 | 2/2015 |
| DE | 10 2013 215 842 A1 | 3/2015 |
| DE | 10 2015 222 288 A1 | 5/2017 |

* cited by examiner

*Primary Examiner* — William C Joyce
*Assistant Examiner* — Gregory Robert Weber
(74) *Attorney, Agent, or Firm* — Maginot, Moore & Beck LLP (57) ABSTRACT

An actuator includes a housing, an extension arm, and a threaded spindle. The threaded spindle is mounted on the housing in such a way as to be rotatable with respect to an axis of rotation by a first rotary bearing. The extension arm projects out of the housing in such a way that it can be moved in a direction of the axis of rotation. The housing and the extension arm together delimit an internal space, the volume of which changes when the extension arm moves. A first end of the threaded spindle that is remote from the first rotary bearing, projects into a tubular section of the extension arm, irrespective of a position in which the extension arm is situated. The tubular section extends with a constant internal cross-sectional shape along the axis of rotation.

19 Claims, 7 Drawing Sheets

ELECTRIC CYLINDER WITH LUBRICATING OIL FILLING

This application claims priority under 35 U.S.C. § 119 to patent application no. DE 10 2020 212 703.4, filed on Oct. 8, 2020 in Germany, the disclosure of which is incorporated herein by reference in its entirety.

The disclosure relates to an actuator.

BACKGROUND

DE 10 2015 222 288 A1 discloses an actuator having a housing and a movable extension arm, wherein the extension arm is driven by a rotatable threaded spindle. By means of an elastic element, a region whose volume does not change when the extension arm moves is created in the internal space of the actuator. This region can accordingly be completely filled with an incompressible liquid. The disadvantage of the elastic element is that in the long-term it does not withstand the permanent alternating stress caused by the movement of the extension arm.

DE 10 2013 215 865 A1 discloses a further similar actuator, in which an end of the threaded spindle which projects into the extension arm is supported on the inside of the extension arm by means of a plastic part against transverse movement. This plastic part is configured in such a way that it cannot prevent the passage of any lubricating oil present in the actuator.

SUMMARY

One advantage of the actuator according to the disclosure is that the heat produced in the corresponding screw drive can be dissipated efficiently to the environment. Moreover, the actuator has a long service life, there being in particular no individual part which has an exceptionally short service life. In addition, the actuator is constructed in a particularly simple and low-cost manner.

The proposal is that the first end of the threaded spindle is connected to a piston, which divides the internal space into a first and a second region, with the result that the first and the second region are delimited in a fluid-tight manner with respect to one another, wherein the first region is delimited exclusively by the piston and by the extension arm. In contrast to the elastic element explained above, the piston, in particular the sealing engagement with respect to the extension arm, can be designed in such a way that it is durable. Corresponding seals are known from hydraulic and pneumatic cylinders and are commercially available at low cost.

The first rotary bearing is preferably arranged in the region of a second end of the threaded spindle, which is remote from the first end. The housing preferably comprises a tubular housing main body, which partially delimits the internal space. The housing main body is preferably produced from aluminum by an extrusion process. An end of the extension arm which is arranged inside the housing is preferably in screw engagement with the threaded spindle, for example via a ball screw or a planetary screw drive. The tubular section of the extension arm is preferably embodied as a circular-cylindrical tube. The piston is preferably provided with a separate seal, in particular a sealing ring, in order to achieve the said fluid-tight delimitation of the first and the second region. The piston is preferably held firmly on the threaded spindle in the direction of the axis of rotation. It is conceivable for the piston to be embodied integrally with the threaded spindle, although it is preferably embodied separately from the threaded spindle.

Provision can be made for an outer circumferential surface of the piston to be matched in a fluid-tight manner to the internal cross-sectional shape of the tubular section, wherein an end face of the piston facing away from the threaded spindle is designed to be closed in such a way that no lubricating oil can pass through there, wherein said end face extends over the entire internal cross-sectional shape of the tubular section. On its outer circumferential surface, the piston preferably has at least one sealing ring, which rests against an inner circumferential surface of the extension arm. The at least one sealing ring is preferably formed integrally in each case, wherein it consists of a flexible material or an elastomer. It may be an O-ring or an X-ring, for example.

Provision can be made for a second rotary bearing to be arranged between the threaded spindle and the piston, thus enabling the threaded spindle to be rotated relative to the piston with respect to the axis of rotation. The second rotary bearing is preferably arranged completely on the side of the end face of the piston on which the threaded spindle is situated. It is thus arranged completely in the second region of the internal space. The frictional forces between the piston and the extension arm typically have the effect that the piston does not rotate relative to the extension arm with respect to the axis of rotation.

Provision can be made for the second rotary bearing to be embodied as a sliding bearing. It is conceivable for the second rotary bearing to be embodied as a rolling bearing, in particular as a radial deep-groove ball bearing.

Provision can be made for the piston to comprise at least two snap-action hooks, which are latched into an annular groove at the first end of the threaded spindle, wherein the snap-action hooks are part of the second rotary bearing. Separate fastening means for the piston, such as retaining rings, can thus be dispensed with.

Provision can be made for the piston to have an integral piston main body, which forms the end face and all the snap-action hooks. The piston main body preferably consists of plastic. It can be produced at low cost by injection molding. Apart from the piston main body, the piston preferably comprises only the seals as further individual parts.

Provision can be made for an end of the extension arm which is arranged inside the housing to be in screw engagement with the threaded spindle via a planetary screw drive, wherein the second region of the internal space is partially filled with a liquid, wherein it is otherwise filled with a gas. In planetary screw drives, a lot of frictional heat is typically generated. By means of the liquid, this can be transferred efficiently to the housing and from there to the environment. By means of the compressible gas, it is possible to take account of the change in volume of the second region. The fluid-tight piston prevents the liquid escaping from the actuator. The liquid is preferably lubricating oil. It may also be a cooling liquid. The liquid is preferably selected in such a way that it does not cause corrosion in the actuator. The second region of the internal space is preferably closed in a fluid-tight manner. It is conceivable for the second region to be in fluid exchange connection with the environment via a valve, wherein the valve is set up in such a way that it imposes an upper limit on the pressure in the second region, and it does not allow any liquid to pass through. The planetary screw drive is preferably in contact with the threaded spindle exclusively via its planets, a gap otherwise being provided between the nut of the planetary screw drive and the threaded spindle. In particular, no end seal with a sealing lip in contact with the threaded spindle is provided on the nut. As a result, the liquid can get into the interior of the planetary screw drive from the internal space substantially without hindrance. Thus, the liquid not only effects lubrication of the screw engagement. In addition, it dissipates the heat produced there very efficiently toward the housing. The gas is preferably air. It is conceivable to use nitrogen, helium or argon as the gas.

Provision can be made for the quantity of liquid to be selected in such a way that the planetary screw drive is at least partially immersed in the liquid, irrespective of the spatial position in which the actuator is situated and irrespective of the position in which the extension arm is situated, wherein the pressure of the gas when the extension arm is fully retracted is below the compressive loading capacity of a seal on the piston. Hence, the cooling and lubricating effect of the liquid is present independently of the installation position and independently of the operating state of the actuator.

Provision can be made for the volume of the liquid to be between 70% and 90% of the volume of the second region of the internal space when the extension arm is fully extended. In this way, on the one hand, the positional independence explained above is ensured, while, on the other hand, the pressure of the gas does not increase excessively when the extension arm is fully retracted.

It is possible to envisage providing the extension arm with a ventilation opening, which is arranged in such a way that the pressure outside the actuator prevails in the first region of the internal space, irrespective of the position in which the extension arm is situated. Accordingly, the volume of the first region can be designed to be very small when the extension arm is fully retracted without there being any risk of an excessive increase in pressure there. The corresponding actuator requires little installation space. The ventilation opening is preferably arranged at the end of the extension arm remote from the housing. It preferably extends in the radial direction from an outer circumferential surface of the extension arm to the first region of the internal space.

It is possible to envisage providing the housing with at least one cooling channel, which runs adjacent to the internal space, wherein the internal space and the at least one cooling channel are delimited in a fluid-tight manner with respect to one another, wherein the at least one cooling channel is connected to an associated fan. By means of the fan, air is preferably conveyed from the environment of the actuator into the at least one cooling channel. The fan is preferably driven by means of an electric motor. The at least one cooling channel is preferably formed integrally on a housing main body, which directly delimits the internal space. The housing main body is preferably produced from aluminum by an extrusion process. A similar fan is known from DE 10 2012 217 399 A1, for example.

It is self-evident that the features mentioned above and those that will be explained below can be used not only in the respectively specified combination but also in other combinations or on their own without departing from the scope of the disclosure.

BRIEF DESCRIPTION OF THE DRAWINGS

The disclosure is explained in greater detail below with reference to the attached drawings. In the drawings.

DETAILED DESCRIPTION

Figure 1:
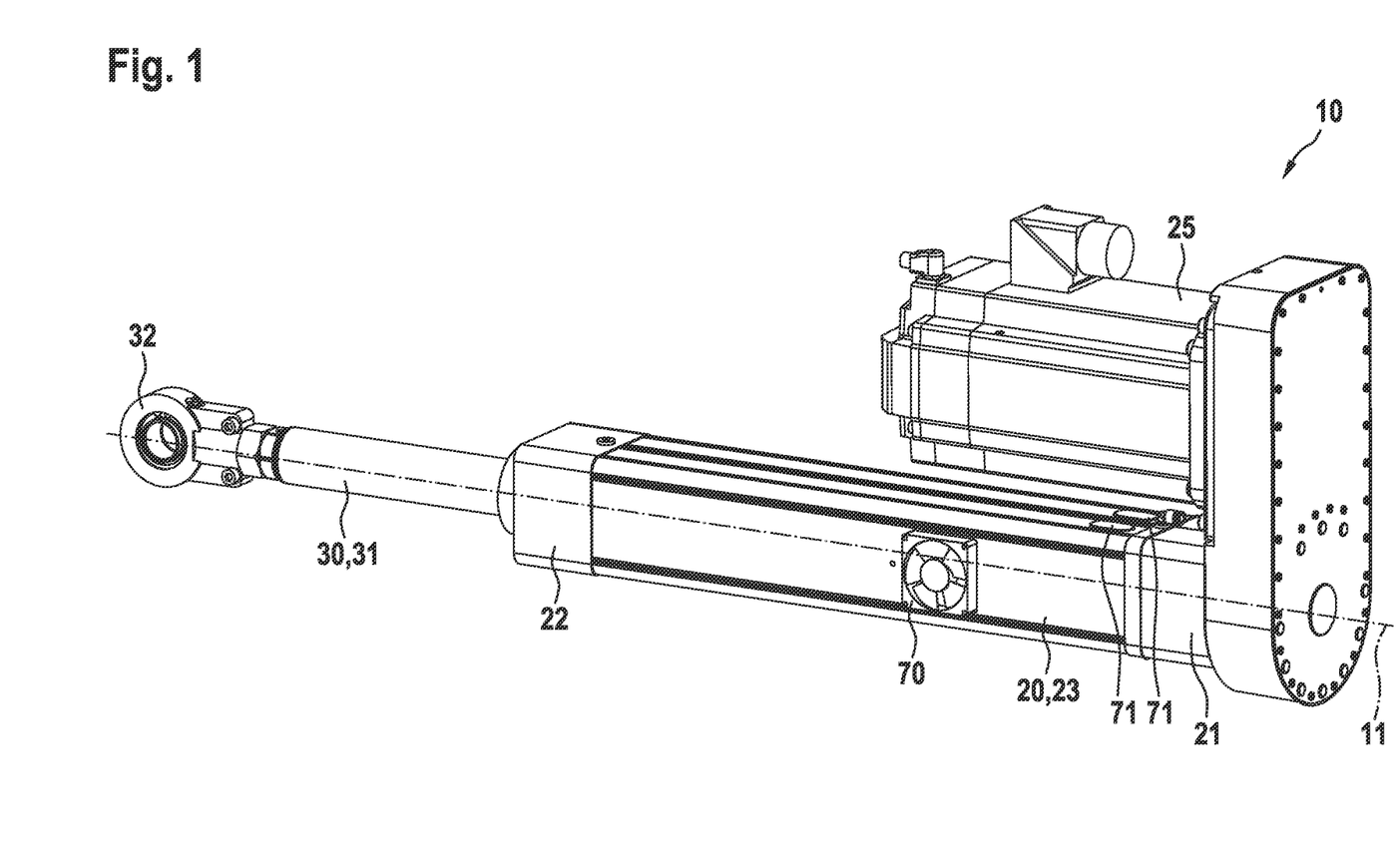
FIG. 1 shows a perspective view of an actuator according to the disclosure.

FIG. 1 shows a perspective view of an actuator 10 according to the disclosure. The actuator 10 comprises a housing 20 which is designed to be elongate along an axis of rotation 11. An extension arm 30 projects out of the housing 20 in the direction of the axis of rotation 11, being movable along the axis of rotation 11 by means of the drive motor 25. The drive motor 25 is preferably an electric motor, which is connected to the threaded spindle in rotary driving connection, e.g. by means of a toothed belt or directly via a coupling. The arrangement of the drive motor 25 in FIG. 1 on the housing 20 is one of several possible variants.

The housing 20 comprises a housing main body 23, which is produced from aluminum by an extrusion process, for example. The housing main body 23 is of tubular design, extending with a constant cross-sectional shape along the axis of rotation 11. The housing 20 comprises a first and a second end block 21; 22, which are fastened on opposite ends of the housing main body 23 in the direction of the axis of rotation 11, preferably by means of screws. The second end block 22 forms a linear sliding bearing for the extension arm 30, in particular for its tubular section 31, which is embodied in the present case as a circular-cylindrical tube. Arranged at the free end of the tubular section 31 is an end head 32, which in the present case is embodied as a joint head, although further variants are possible.

In the present case, two fans 70 are provided on the outside of the housing main body 23, said fans being fastened on the housing main body 23 opposite one another. These suck in air from the environment by means of an electrically driven fan wheel and force it into the cooling channels (No. 26 in FIG. 6) in the housing main body 23. Curved deflection channels are provided in the first and/or in the second end block 21; 22, said channels each connecting two cooling channels to one another in the housing main body 23. Furthermore, air outlets 71 are provided on the housing main body 23, each being connected to an associated cooling channel. There, the air conveyed into the cooling channels by the fans 70 can reemerge from the cooling channels.

Figure 2:
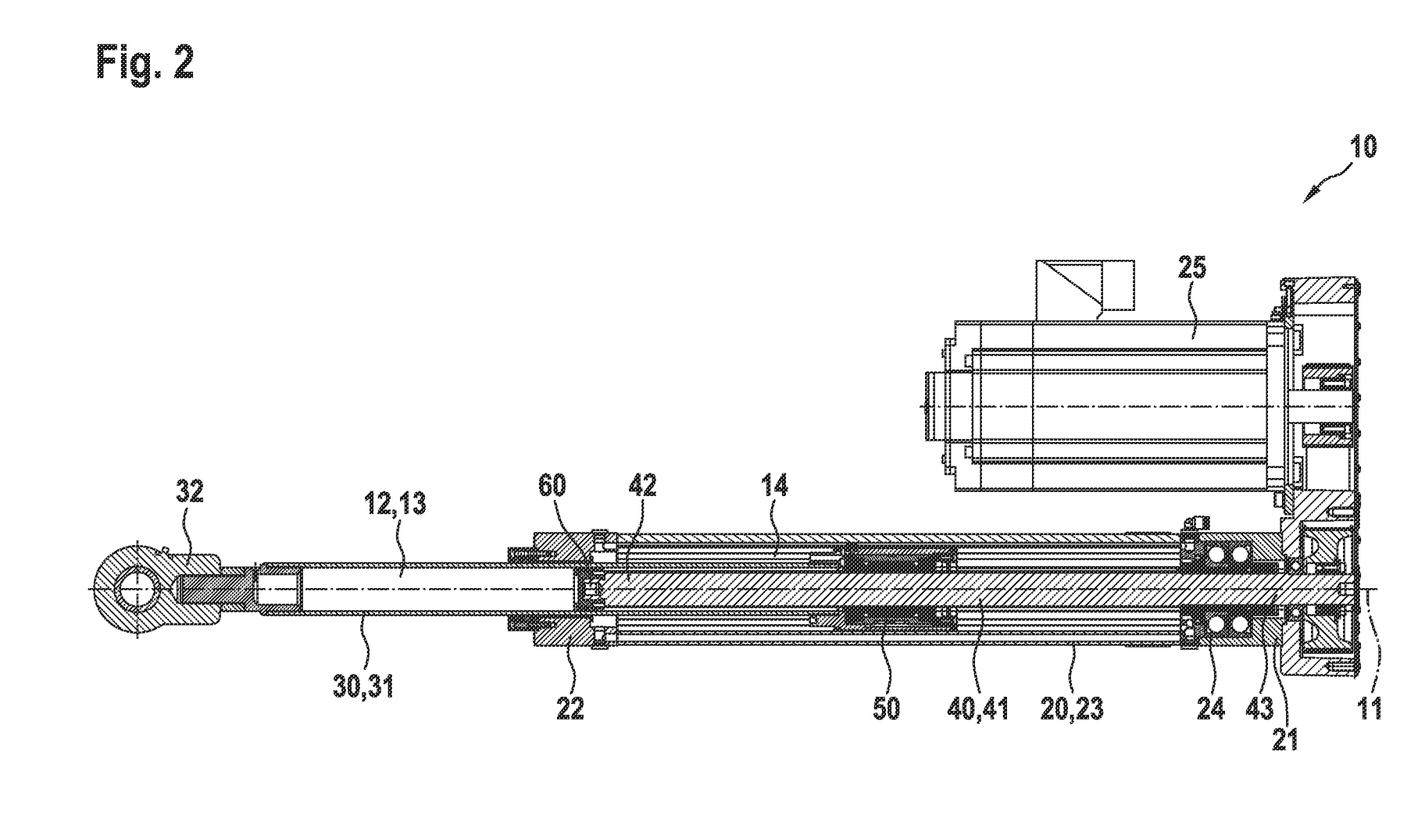
FIG. 2 shows a longitudinal section of the actuator according to FIG. 1.

FIG. 2 shows a longitudinal section of the actuator according to FIG. 1. A threaded spindle 41 extending along the axis of rotation 11 is arranged in the interior of the housing 20. At a second end 43, the threaded spindle 41 is rotatably mounted in the first end block 21 with respect to the axis of rotation 11. In the present case, the corresponding rotary bearing 24 comprises two angular contact ball bearings, it being possible for more individual bearings to be provided, depending on the desired axial force. At the first end remote from the rotary bearing 24, the threaded spindle 41 projects into the tubular section 31 of the extension arm 30, passing through a nut 50 which is connected in a fixed manner to one end of the extension arm 30. The nut 50 and the threaded spindle 41 together form a planetary screw drive 40.

The piston 60 according to the disclosure is arranged at the first end 42 of the threaded spindle 41. This delimits a first and a second region 13; 14 of the internal space 12 from one another. In this case, the internal space 12 is the entire space which is jointly bounded by the extension arm 30 and by the housing 20. The second region 14 of the internal space is closed in a fluid-tight manner with respect to the outside. The first region 13, which is delimited exclusively by the extension arm 30 and by the piston 60, is preferably connected to the environment via a ventilation opening (No. 33 in FIG. 7), and therefore it is the pressure in the environment of the actuator 10 which prevails there, irrespective of the position of the extension arm. The pressure in the second region 14, on the other hand, fluctuates when the extension arm 30 moves.

During operation of the planetary screw drive 40, considerable frictional heat is generated in the rolling contact, especially when the planetary screw drive 40 is transmitting large axial forces.

Figure 3:
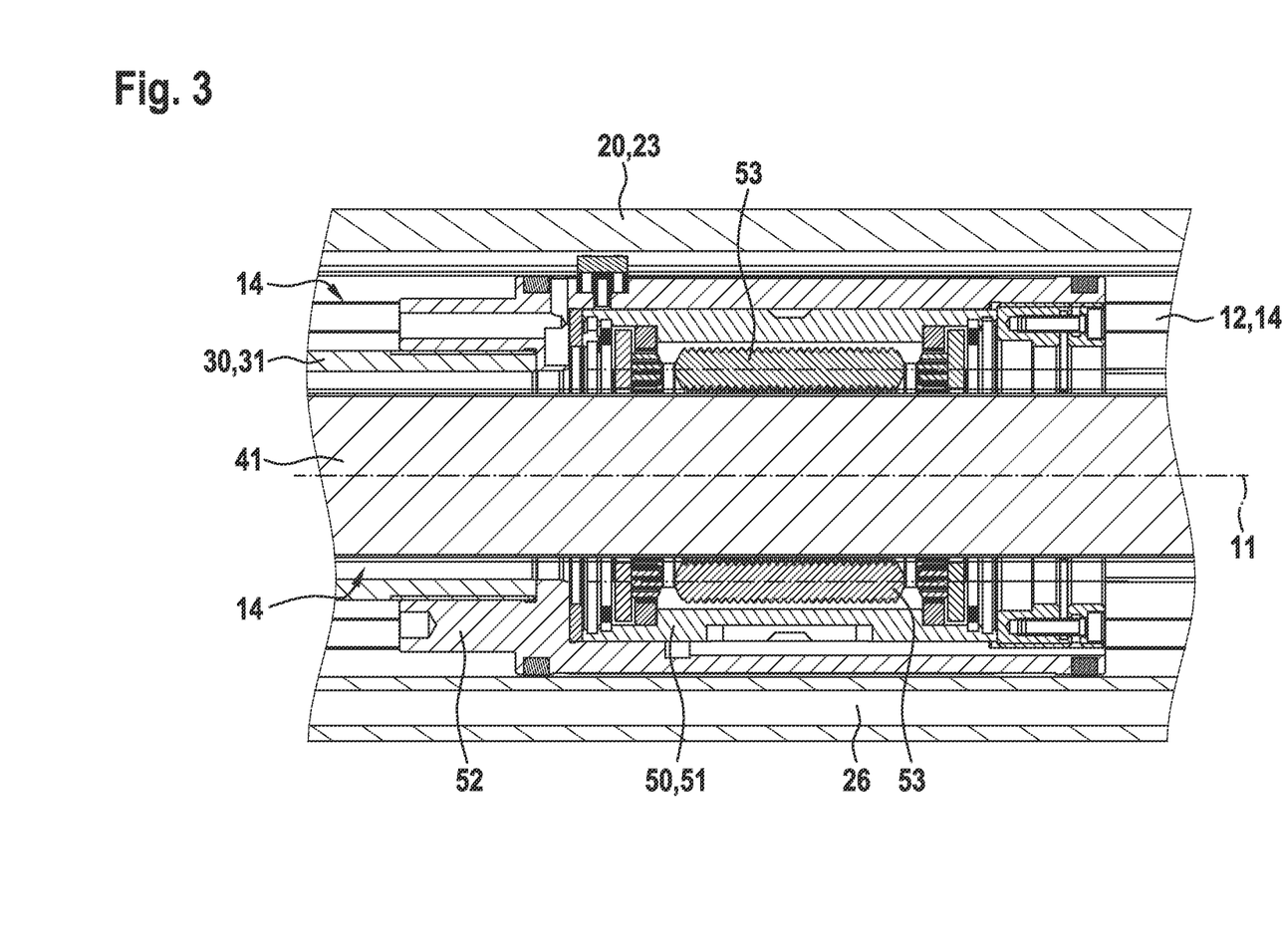
FIG. 3 shows an enlarged detail of FIG. 2 in the region of the nut.

FIG. 3 shows an enlarged detail of FIG. 2 in the region of the nut 50. The threaded spindle 41, the planets 53 and the nut main body 50 together form a planetary screw drive 40. The nut main body 50 is connected in a fixed manner to the tubular section 31 of the extension arm 30 via the separate holding part 52. Furthermore, an anti-rotation device is provided on the holding part 52, preventing the nut 50, namely the holding part 52, and the nut main body 51 from rotating relative to the housing 20 with respect to the axis of rotation 11. The anti-rotation device can be embodied according to DE 10 2013 215 842 A1, for example, the entire content of which is referred to and made part of the content of the present application.

In the present case, the nut 50 is not provided with end seals. The liquid present in the second region 14 of the internal space 12, which is formed in particular by lubricating oil, can therefore flow through the nut 50, with the result that the latter is cooled from the inside. In FIG. 3, the reference number 14 is entered several times in order to identify all sections of the second region. This makes it clear that the second region 14 of the internal space 12 is arranged on both sides of the nut 50.

It can furthermore be seen from FIG. 3 that the cooling channel 26 in the housing main body 23 is arranged directly adjacent to the second region 14 of the internal space 12, which is partially filled with liquid. Accordingly, the thermal energy contained in the liquid can be transferred efficiently to the cooling air in the at least one cooling channel 26.

Figure 4:
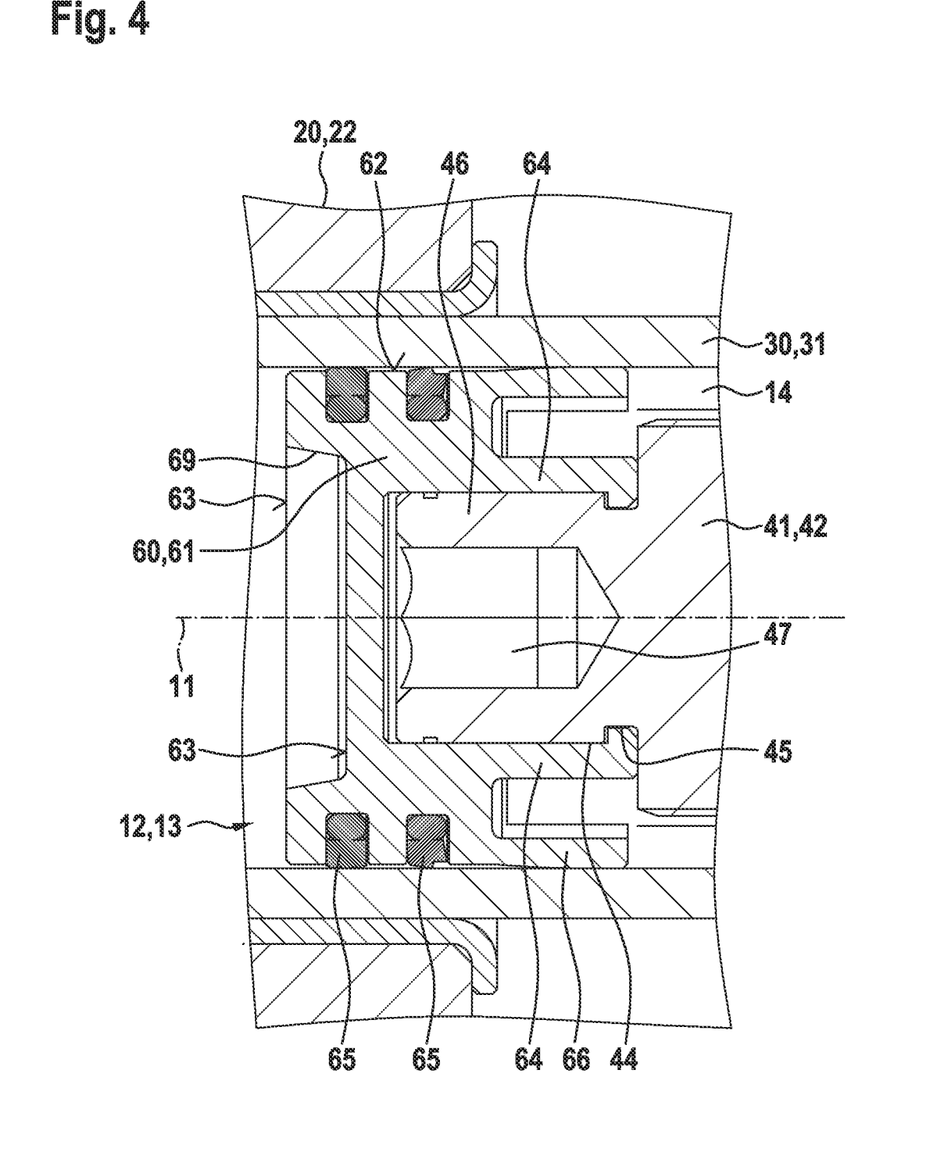
FIG. 4 shows an enlarged detail of FIG. 2 in the region of the piston.

FIG. 4 shows an enlarged detail of FIG. 2 in the region of the piston 60. The inner cross-sectional shape of the extension arm 30 is of circular design, being constant along the axis of rotation 11. The outer circumferential surface 61 of the integral piston main body 61 of the piston 60 is correspondingly of circular-cylindrical design, it being matched to the extension arm 30 with little play. The remaining small gap is closed in a fluid-tight manner by means of two seals 65, and therefore the liquid cannot pass from the second region 14 of the internal space 12 to the first region 13 there, even if the liquid is put under pressure by the movement of the extension arm 30. The seals 65 are each embodied as sealing rings, which are accommodated in a matching groove in the piston main body 61, which groove extends in a circular ring shape with respect to the axis of rotation 11. In the present case, two seals 65 are provided, which are arranged adjacent to one another along the axis of rotation 11. The selected number depends, inter alia, on the maximum pressure with which the liquid is present at the seals 65.

The end face of the piston 60 which faces in the direction of the first region 13 is of completely closed design, and therefore the lubricating oil cannot pass through there from the second region 14. In the present case, it is provided with a depression 69 which serves, inter alia, to avoid distortion of the piston 90. The piston 60 consists of plastic and is preferably produced by injection molding. In this case, distortion can occur as the plastic cools, particularly if the corresponding injection-molded component has very different wall thicknesses. Precisely these are avoided with the said depression 69.

At the first end 42, the threaded spindle 41 is provided with a pin 46, which is circular-cylindrical with respect to the axis of rotation 11 and is formed integrally with the remainder of the threaded spindle 41. An annular groove 45 is provided in the angle at the foot of the pin 46, into which snap-action hooks 64 on the piston main body 61 engage positively, with the result that the piston 60 is held positively on the threaded spindle 41 in the direction of the axis of rotation 11. The snap-action hooks 64 simultaneously form a second rotary bearing 44, with the result that the piston 60 is mounted on the threaded spindle 41 in such a way that it can be rotated with respect to the axis of rotation 11. The rotation of the threaded spindle 41 therefore essentially does not lead to a rotary movement between the seals 65 and the extension arm 30, thus ensuring that wear is avoided there. In the present case, the second rotary bearing 44 is embodied as a sliding bearing, although the use of a rolling bearing is likewise conceivable.

Furthermore, attention should be drawn to the hexagon socket 47 on the end of the pin 46, which simplifies the assembly or disassembly of the actuator.

Figure 5:
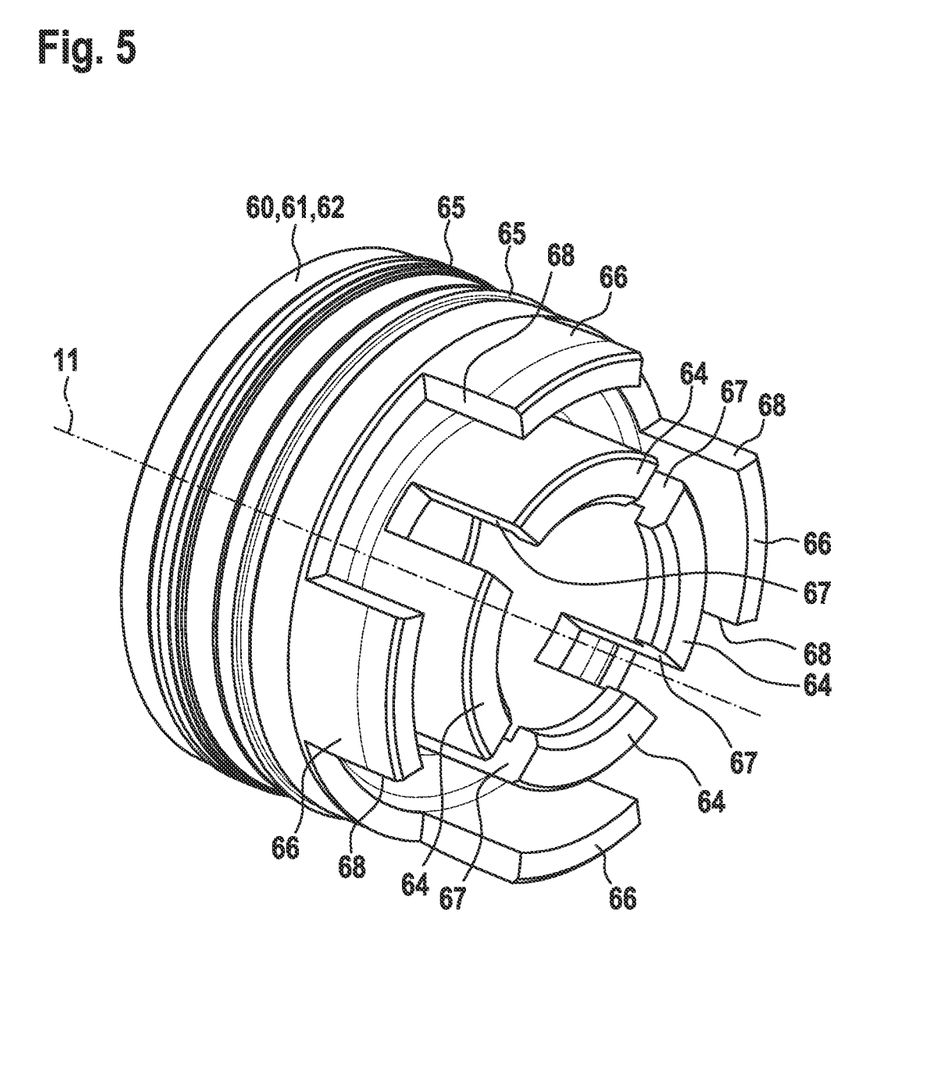
FIG. 5 shows a perspective view of the piston.

FIG. 5 shows a perspective view of the piston 60. The total of four snap-action hooks 64 is arranged in a uniformly distributed manner around the axis of rotation 11, being separated from one another by first slots 67. The stiffness of the snap-action hooks 64 is designed in such a way that the piston 60 is held securely on the threaded spindle in the direction of the axis of rotation 11, although it is nevertheless possible for the piston 60 to be mounted on the threaded spindle without damage to the piston 60 occurring.

Furthermore, attention should be drawn to the guide extensions 66 on the piston main body 61. These extend in the direction of the axis of rotation 11 toward the threaded spindle. The substantially circular-cylindrical outer circumferential surface 62 is designed there with a somewhat smaller diameter than in the region of the seals 65. In the present case, a total of four guide extensions is provided, these being arranged in a uniformly distributed manner around the axis of rotation 11, being separated from one another by second slots 68. The guide extensions 66 are intended to prevent the piston 60 from tilting excessively owing to the minimal play between the piston main body 61 and the extension arm.

Figure 6:
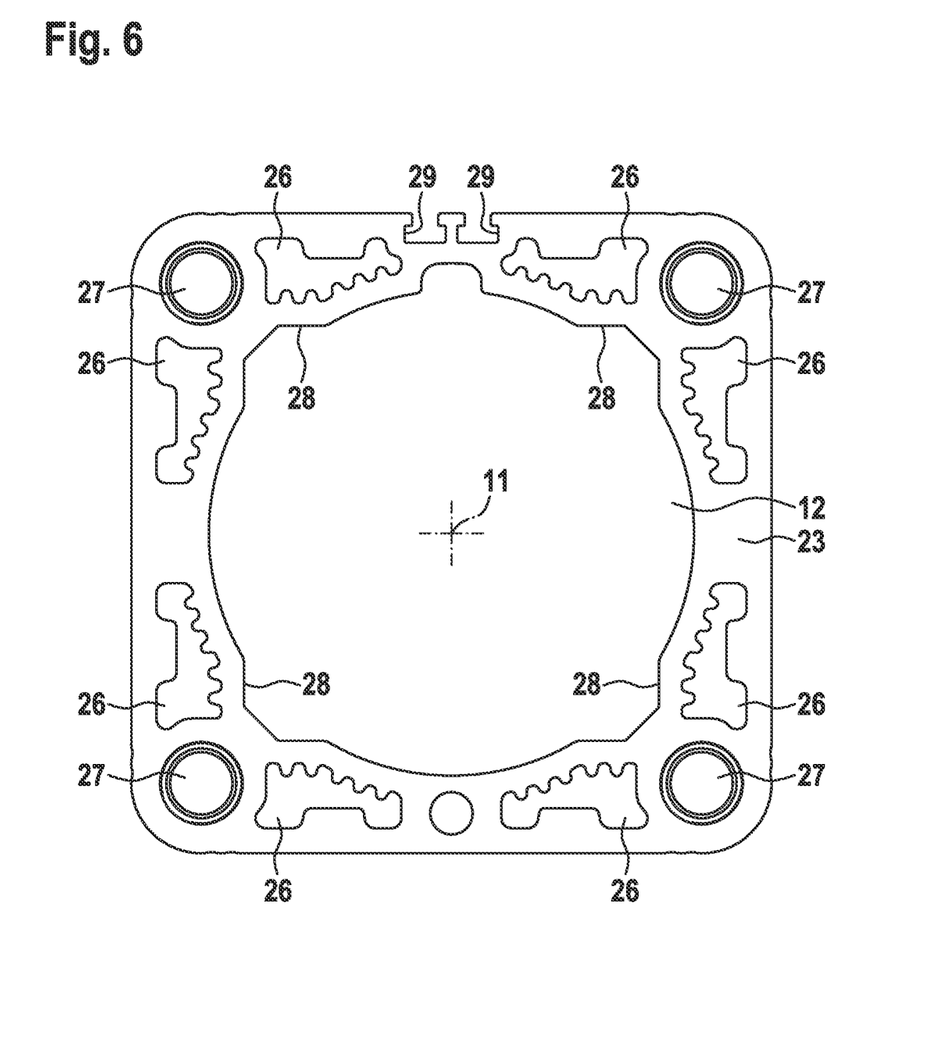
FIG. 6 shows a cross section of the housing main body.

FIG. 6 shows a cross section of the housing main body 23. The housing main body 23 is preferably produced from aluminum by an extrusion process, the cross-sectional shape being optimized in accordance with this production process. The cross-sectional shape shown in FIG. 6 is constant over the entire length of the housing main body 23. The external shape of the housing main body 23 is square with rounded corners. At each of the four corners, a screw channel 27 is provided, into which an internal thread is cut in order to screw-fasten the first or the second end block there. The two T slots 29 on the outside of the housing main body 23 serve, inter alia, to receive sensors or limit switches, by means of which the position of the extension arm or of the nut can be detected.

The internal shape is circular with respect to the axis of rotation 11, four trapezoidal slideways 28 being provided for the slide bars on the nut, which prevent rotation of the nut relative to the housing.

In addition, a total of eight cooling channels 26 is provided, which are provided with cooling fins on their inner side in order to increase the heat-transferring surface area. Two cooling channels 26 are in each case connected to one another via curved channels in the first and/or in the second end block, wherein ambient air can be blown into the cooling channels 26 by means of the fans (No. 70 in FIG. 1).

Figure 7:
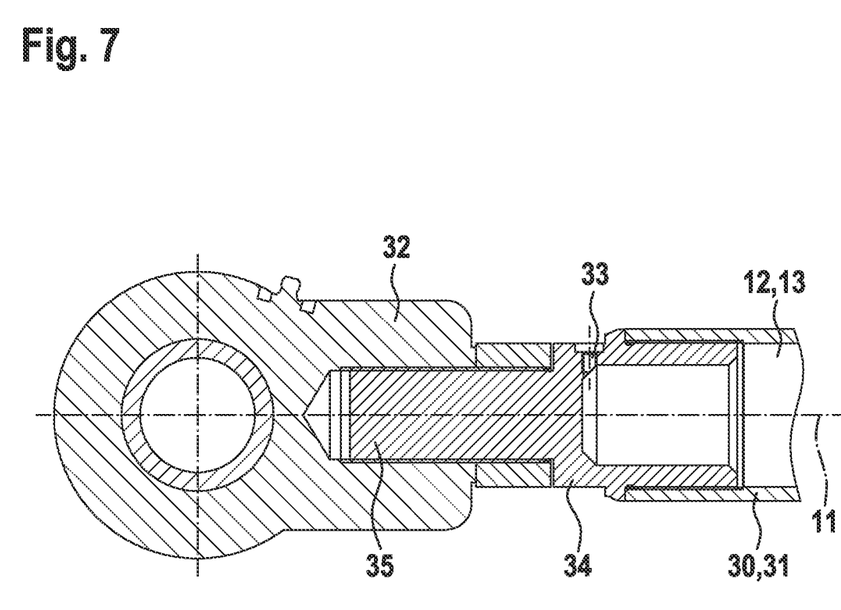
FIG. 7 shows an enlarged detail of FIG. 2 in the region of the end head.

FIG. 7 shows an enlarged detail of FIG. 2 in the region of the end head 32. The tubular section 31 of the extension arm 30 is embodied in the form of a tube which is circular-cylindrical with respect to the axis of rotation 11 and is preferably composed of steel. The latter is firmly closed at the end by a threaded insert 34, wherein the threaded insert 34 has a threaded pin 35, onto which different end heads 32 can be screwed. In the present case, the end head 32 is embodied as a joint head.

In the threaded insert 34, a ventilation opening 33 is provided, which extends radially with respect to the axis of rotation 11. The first region 13 of the internal space 12 is connected to the environment of the actuator via the ventilation opening 33. The pressure of the environment therefore prevails in the first region 13, irrespective of the position in which the extension arm 30 is situated.

REFERENCE SIGNS

10 actuator
11 axis of rotation
12 internal space
13 first region of the internal space
14 second region of the internal space
20 housing
21 first end block
22 second end block
23 housing main body
24 first rotary bearing
25 drive motor
26 cooling channel
27 screw channel
28 slideway
29 T slot
30 extension arm
31 tubular section
32 end head
33 ventilation opening
34 threaded insert
35 threaded pin
40 planetary screw drive
41 threaded spindle
42 first end of the threaded spindle
43 second end of the threaded spindle
44 second rotary bearing
45 annular groove
46 pin
47 hexagon socket
50 nut
51 nut main body
52 holding part
53 planet
60 piston
61 piston main body
62 outer circumferential surface of the piston
63 end face of the piston
64 snap-action hook
65 seal
66 guide extension
67 first slot
68 second slot
69 depression
70 fan
71 air outlet

The invention claimed is:

1. An actuator comprising:
a housing;
an extension arm; and
a threaded spindle,
wherein the threaded spindle is mounted on the housing by a first rotary bearing and the threaded spindle is rotatable with respect to an axis of rotation,
wherein the extension arm projects out of the housing and is movable in a direction of the axis of rotation,
wherein the housing and the extension arm together delimit an internal space, the volume of the internal space configured to change when the extension arm moves,
wherein a first end of the threaded spindle is remote from the first rotary bearing and is configured to project into a tubular section of the extension arm irrespective of a position in which the extension arm is situated,
wherein the tubular section extends with a constant internal cross-sectional shape along the axis of rotation,
wherein the first end of the threaded spindle is connected to a piston, the piston configured to divide the internal space into a first region and a second region,
wherein the first region and the second region are delimited in a fluid-tight manner with respect to one another,
wherein the first region is delimited exclusively by the piston and by the extension arm,
wherein a second rotary bearing is arranged between the threaded spindle and the piston,
wherein the threaded spindle is configured for rotation relative to the piston with respect to the axis of rotation,
wherein the piston comprises at least two snap-action hooks latched into an annular groove at the first end of the threaded spindle, and
wherein the at least two snap-action hooks are part of the second rotary bearing.

2. The actuator according to claim 1, wherein:
an outer circumferential surface of the piston is matched in a fluid-tight manner to the constant internal cross-sectional shape of the tubular section,
an end face of the piston, facing away from the threaded spindle, is configured to be closed, and
the end face extends over an entirety of the constant internal cross-sectional shape of the tubular section.

3. The actuator according to claim 2, wherein the piston comprises an integral piston main body forming the end face and the at least two snap-action hooks.

4. The actuator according to claim 1, wherein the second rotary bearing includes a sliding bearing.

5. An actuator, comprising:
a housing;
an extension arm; and
a threaded spindle, wherein the threaded spindle is mounted on the housing by a first rotary bearing and the threaded spindle is rotatable with respect to an axis of rotation, wherein the extension arm projects out of the housing and is movable in a direction of the axis of rotation, wherein the housing and the extension arm together delimit an internal space, the volume of the internal space configured to change when the extension arm moves, wherein a first end of the threaded spindle is remote from the first rotary bearing and is configured to project into a tubular section of the extension arm irrespective of a position in which the extension arm is situated, wherein the tubular section extends with a constant internal cross-sectional shape along the axis of rotation, wherein the first end of the threaded spindle is connected to a piston, the piston configured to divide the internal space into a first region and a second region, wherein the first region and the second region are delimited in a fluid-tight manner with respect to one another, wherein the first region is delimited exclusively by the piston and by the extension arm, wherein an end of the extension arm is arranged inside the housing and is in screw engagement with the threaded spindle via a planetary screw drive, wherein the second region of the internal space is partially filled with a liquid, and wherein the second region is otherwise filled with a gas.

6. The actuator according to claim 5, wherein:
a quantity of the liquid is selected to at least partially immerse the planetary screw drive irrespective of a spatial position in which the actuator is situated and irrespective of a position in which the extension arm is situated, and
a pressure of the gas when the extension arm is fully retracted is below a compressive loading capacity of a seal on the piston.

7. The actuator according to claim 5, wherein a volume of the liquid is between 70% and 90% of a volume of the second region of the internal space when the extension arm is fully extended.

8. The actuator according to claim 5, wherein:
the housing includes at least one cooling channel running adjacent to the internal space,
the internal space and the at least one cooling channel are delimited in a fluid-tight manner with respect to one another, and
the at least one cooling channel is connected to an associated fan.

9. The actuator according to claim 5, wherein:
an outer circumferential surface of the piston is matched in a fluid-tight manner to the constant internal cross-sectional shape of the tubular section,
an end face of the piston, facing away from the threaded spindle, is configured to be closed, and
the end face extends over an entirety of the constant internal cross-sectional shape of the tubular section.

10. The actuator according to claim 5, wherein:
a second rotary bearing is arranged between the threaded spindle and the piston, and
the threaded spindle is configured for rotation relative to the piston with respect to the axis of rotation.

11. The actuator according to claim 10, wherein the second rotary bearing includes a sliding bearing.

12. The actuator according to claim 10, wherein:
the piston comprises at least two snap-action hooks latched into an annular groove at the first end of the threaded spindle, and
the at least two snap-action hooks are part of the second rotary bearing.

13. The actuator according to claim 12, wherein the piston comprises an integral piston main body forming the end face and the at least two snap-action hooks.

14. An actuator, comprising:
a housing;
an extension arm; and
a threaded spindle,
wherein the threaded spindle is mounted on the housing by a first rotary bearing and the threaded spindle is rotatable with respect to an axis of rotation,
wherein the extension arm projects out of the housing and is movable in a direction of the axis of rotation,
wherein the housing and the extension arm together delimit an internal space, the volume of the internal space configured to change when the extension arm moves,
wherein a first end of the threaded spindle is remote from the first rotary bearing and is configured to project into a tubular section of the extension arm irrespective of a position in which the extension arm is situated,
wherein the tubular section extends with a constant internal cross-sectional shape along the axis of rotation,
wherein the first end of the threaded spindle is connected to a piston, the piston configured to divide the internal space into a first region and a second region,
wherein the first region and the second region are delimited in a fluid-tight manner with respect to one another,
wherein the first region is delimited exclusively by the piston and by the extension arm, and
wherein the extension arm includes a ventilation opening arranged such that a pressure outside the actuator prevails in the first region of the internal space irrespective of a position in which the extension arm is situated.

15. The actuator according to claim 14, wherein:
an outer circumferential surface of the piston is matched in a fluid-tight manner to the constant internal cross-sectional shape of the tubular section,
an end face of the piston, facing away from the threaded spindle, is configured to be closed, and
the end face extends over an entirety of the constant internal cross-sectional shape of the tubular section.

16. The actuator according to claim 14, wherein:
a second rotary bearing is arranged between the threaded spindle and the piston, and
the threaded spindle is configured for rotation relative to the piston with respect to the axis of rotation.

17. The actuator according to claim 16, wherein the second rotary bearing includes a sliding bearing.

18. The actuator according to claim 14, wherein:
the piston comprises at least two snap-action hooks latched into an annular groove at the first end of the threaded spindle, and
the at least two snap-action hooks are part of the second rotary bearing.

19. The actuator according to claim 18, wherein the piston comprises an integral piston main body forming the end face and the at least two snap-action hooks.

* * * * *